(12) United States Patent
Gotteland et al.

(10) Patent No.: US 9,045,814 B2
(45) Date of Patent: Jun. 2, 2015

(54) SLURRY CATALYST AND SLURRY FLAKES VALORIZATION

(75) Inventors: Delphine Gotteland, Rueil Malmaison (FR); Katell Le Lannic-Dromard, Le Havre (FR); Marie Ropars, Cleon (FR); Gloria Vendrell, Le Havre (FR); Maxime Lacroix, Uccle (BE); Didier Borremans, Boussu (BE)

(73) Assignee: TOTAL RAFFINAGE MARKETING, Puteaux (FR)

(*) Notice: Subject to any disclaimer, the term of this patent is extended or adjusted under 35 U.S.C. 154(b) by 126 days.

(21) Appl. No.: 13/808,466

(22) PCT Filed: Jul. 6, 2011

(86) PCT No.: PCT/EP2011/061366
§ 371 (c)(1),
(2), (4) Date: Feb. 21, 2013

(87) PCT Pub. No.: WO2012/004284
PCT Pub. Date: Jan. 12, 2012

(65) Prior Publication Data
US 2013/0150232 A1    Jun. 13, 2013

(30) Foreign Application Priority Data

Jul. 6, 2010    (EP) .................................... 10305742

(51) Int. Cl.
*B01J 38/48*    (2006.01)
*B01J 38/68*    (2006.01)
*B01J 38/60*    (2006.01)
(Continued)

(52) U.S. Cl.
CPC ................ *C22B 61/00* (2013.01); *C10G 49/00* (2013.01); *C10G 49/04* (2013.01); *C10G 49/12* (2013.01); *C10G 49/22* (2013.01); *C22B 3/08* (2013.01); *C22B 3/44* (2013.01); *C22B 7/007* (2013.01); *C22B 23/026* (2013.01); *C22B 34/225* (2013.01); *C22B 34/345* (2013.01); *C10G 2300/205* (2013.01); *C10G 2300/4081* (2013.01); *C10G 2300/42* (2013.01);
(Continued)

(58) Field of Classification Search
CPC ............ C22B 61/00; C22B 3/08; C22B 3/44; C22B 7/007; C22B 23/026; C22B 23/04; C22B 34/225; C22B 34/345; C10G 49/00; C10G 49/04; C10G 49/12; C10G 49/22; C10G 2300/205; C10G 2300/4081; C10G 2300/42; C10G 2300/706; B01J 23/94; C01B 3/02
USPC ..................................................... 502/20–56
See application file for complete search history.

(56) References Cited

U.S. PATENT DOCUMENTS

| | | |
|---|---|---|
| 4,592,827 A | 6/1986 | Galiasso et al. |
| 4,770,764 A | 9/1988 | Ohtake et al. |

(Continued)

FOREIGN PATENT DOCUMENTS

EP    1 335 031 A1    8/2003

OTHER PUBLICATIONS

International Search Report [PCT/ISA/210] for PCT/EP2011/061366, Mar. 19, 2012.

*Primary Examiner* — Jennifer A Smith
(74) *Attorney, Agent, or Firm* — Sughrue Mion, PLLC (57) ABSTRACT

The instant invention discloses a method for the valorization of spent catalyst from hydrocarbon processing slurry reactors as well as slurry flakes.

16 Claims, 4 Drawing Sheets (51) Int. Cl.
*B01J 38/02* (2006.01)
*C22B 61/00* (2006.01)
*C10G 49/00* (2006.01)
*C10G 49/04* (2006.01)
*C10G 49/12* (2006.01)
*C10G 49/22* (2006.01)
*C22B 3/08* (2006.01)
*C22B 3/44* (2006.01)
*C22B 7/00* (2006.01)
*C22B 23/02* (2006.01)
*C22B 34/22* (2006.01)
*C22B 34/34* (2006.01)
*B01J 23/94* (2006.01)
*C01B 3/02* (2006.01)
*C22B 3/00* (2006.01)

(52) U.S. Cl.
CPC ............ *C10G2300/706* (2013.01); *B01J 23/94* (2013.01); *C01B 3/02* (2013.01); *C22B 23/04* (2013.01)

(56) References Cited

U.S. PATENT DOCUMENTS

| | | |
|---|---|---|
| 4,824,821 A | 4/1989 | Lopez et al. |
| 2009/0264279 A1* | 10/2009 | Hedrick .................. 502/43 |

* cited by examiner

SLURRY CATALYST AND SLURRY FLAKES VALORIZATION

CROSS REFERENCE TO RELATED APPLICATIONS

This application is a National Stage of International Application No. PCT/EP2011/061366 filed Jul. 6, 2011, claiming priority based on European Patent Application No. 10 305 742.8 filed Jul. 6, 2010, the contents of all of which are incorporated herein by reference in their entirety.

Slurry catalyst and slurry flakes valorization. The instant invention discloses a method for the valorization of spent catalyst from hydrocarbon processing slurry reactors as well as slurry flakes.

Slurry reactors are typically used in hydrocarbon refining processes for the treatment of heavy residues such as conventional vacuum distillation residue (VR) or vacuum visbroken residues (VVR).

Flakes are the final residues of slurry processing. They are frequently very heavy residues which contain high boiling point species and most of the metals which were present in initial crude feedstock. Flakes also contain spent slurry catalyst which generally consists of metal chalcogenide species, the metal being typically molybdenum, tungsten or iron.

For all these reasons, flakes are a concern for slurry hydroconversion processes. Flakes are mostly burnt for heat production.

Hydrogen consumption is critical in a slurry plant. Lack of hydrogen always results in poorly converted residues and low quality products.

It has now been found that flakes valorization can be optimized using a gasification/partial oxidation process (PDX).

Gasification/partial oxidation process results in metal recovery (catalyst and metals contained in the feedstock) and hydrogen generation.

Potential savings for catalytic metal recovery can be estimated. For example, hydroconversion process requires 800 kg/Mo per day in a 25000 barrels/day unit operating at 200 ppm molybdenum based catalyst concentration.

Gasification/partial oxidation allows catalyst recovery together with residual Nickel and Vanadium which are contained in the feedstock.

Metal concentration in vacuum residues varies from 5 to 150 ppm for Ni and from 20 to 400 ppm for Vanadium. Obviously, the most interesting feedstocks to valorize in slurry hydroconversion processes are the heaviest ones, and thus the richest in metals.

A first object of the invention is a method for the treatment of a metal containing hydrocarbon feedstock issued from an industrial unit using a metal containing catalyst, wherein spent metal containing catalyst and metal containing residual hydrocarbon feedstock are collected and treated to produce carbon monoxide, hydrogen and a metal containing residue.

Such treatment is preferably a calcination, most preferably performed under partial oxidation conditions.

Gasification/partial oxidation results in syngas production that will advantageously generate hydrogen to partially feed the highly hydrogen-consuming hydroconversion process. Hydrocarbon load (slurry flakes) is burnt in dedicated furnaces in the presence of water and oxygen at ca. 1300° C. to produce hydrogen and carbon monoxide.

Advantageously, hydrogen produced by the method of treatment of the invention may be used for hydroconversion of the metal containing hydrocarbon feedstock, preferably for hydroconversion of the metal containing hydrocarbon feedstock in slurry reactors.

Consumption of hydrogen within the slurry process can go up to 3-4% wt relative to the feedstock (and more if combined with fixed bed hydrotreatment), depending on treated feedstock and performances target.

The gasification/PDX unit can be dedicated to the slurry hydroconversion process or shared with an existing unit (cofeeding).

Commercial PDX units running on liquid feedstock (ex: straight run vacuum residues, visbroken vacuum residues) can manage solids mixed together with the feedstock (or solved in the feedstock). For example, soot in a VVR dedicated PDX unit can be coprocessed up to 1.5% wt.

Advantageously, the metal containing residue produced by the method of treatment of the invention will be recycled, preferably to recover the metals contained therein, for example to produce fresh metal containing catalyst. The method used for recycling metals from the metal containing residue may be the method according to the invention disclosed below.

A PDX unit that is converting 50677 kg/h feedstock stream containing 1.3% wt soot produces ca. 677 kg/h of metal residue.

The metal containing catalyst and the metal contained in the metal containing hydrocarbon feedstock may each be independently selected among aluminum, tin, transition metals and combinations thereof.

Preferably, the metal contained in the metal containing catalyst is selected among aluminum, iron, molybdenum, tungsten, nickel, cobalt and their combinations.

Preferably, the metal contained in the metal containing hydrocarbon feedstock is selected among vanadium, nickel, cobalt, iron, and combinations thereof.

Obviously, the above mentioned metals are also present in the spent metal containing catalyst (also called spent catalyst) or in a metal containing residual hydrocarbon feedstock resulting from the treatment of the metal containing hydrocarbon feedstock.

Said spent metal containing catalyst and metal containing residual hydrocarbon feedstock can be issued from deasphalting residue. Examples of other feedstocks that can be used are disclosed below in reference to tables 1 to 10.

Flakes have high viscosities. In order to improve their pumpability at the outlet of the slurry hydroconversion process, they can be mixed with a coprocessing feed and sent to gasification. In case of a dedicated PDX unit running on pure flakes, the latter can be diluted with a solvent (e.g. toluene) for transport. Solvent would then be removed by evaporation before gasification. According to a preferred embodiment, flakes are diluted with small amount of slurry feedstock.

Another object of the invention is a method for recycling metals, preferably molybdenum, vanadium and nickel, contained in a spent catalyst and/or a metal containing hydrocarbon feedstock, wherein said spent catalyst and/or metal containing hydrocarbon feedstock successively undergoes (i) calcination to remove carbon containing material, (ii) washing with water, (iii) acidification with sulfuric acid to obtain an acidic water and a first precipitate which is separated, (iv) alkalinization of said acidic water with sodium hydroxide to obtain an alkaline water and a second precipitate which is separated.

Preferably, said calcination is performed so as to collect carbon monoxide and hydrogen.

Thus, said calcination can be performed under partial oxidation conditions, for example the same as those described above, or as mentioned below in the embodiment of this recycling method.

In a general manner, the raw gas produced by the calcination step (i) is washed with water in step (ii) to remove the soot produced by the calcination step (i). The waste water obtained from step (ii) then undergoes steps (iii) and (iv) to recover the metals. Said waste water issued from step (ii) contains only metals.

This is described in details below in the embodiment of this recycling method and in the description of FIGS. 1-2.

As already mentioned, the metal containing residue obtained from the above mentioned method (in which a spent metal containing catalyst and metal containing residual hydrocarbon feedstock are collected and treated to produce carbon monoxide, hydrogen and said metal containing residue) can be recycled using the method for recycling metals according to the invention.

In the method for recycling metals according to the invention, said spent catalyst and/or metal containing hydrocarbon feedstock is then obtained by the treatment of a metal containing hydrocarbon feedstock issued from an industrial unit using a metal containing catalyst, and before step (i) said spent catalyst and/or metal containing hydrocarbon feedstock are collected and treated to produce carbon monoxide, hydrogen and a metal containing residue, said metal containing residue being processed by steps (i) to (iv).

Said spent metal containing catalyst and metal containing residual hydrocarbon feedstock can be issued from deasphalting residue.

In the method for recycling metals according to the invention, the "metal containing hydrocarbon feedstock" can be a "metal containing residual hydrocarbon feedstock" (which has undergone a treatment in an industrial unit) or any metal containing hydrocarbon feedstock.

The hydrogen produced in the methods of the invention can be used for hydroconversion of hydrocarbon feedstock in slurry reactors.

Thus, the invention also concerns a method for producing hydrogen using the methods according the invention.

Advantageously, (FeCl(SO4)) is added at steps (iii) and (iv).

Preferably, the method for recycling undergoes a further step (v) wherein alkaline water is further neutralized with an acid.

Vanadium pentoxide ($V_2O_5$) and iron-molybdenum-nickel alloy can be obtained by introduction of first and/or second precipitate of steps (iii) (iv) into melted iron.

An embodiment of this recycling method is detailed below.

After being cooled at the outlet of the gasification reactors, the resulting raw gas is scrubbed with circulating water to remove the soot. A soot treatment unit extracts the soot, which are recycled (co-feed or solvent) from the waste water.

The waste water stream contains all the metals and heavy metals particles, such as Vanadium, Nickel, Sulfur, oxidizable substances and the catalytic metals.

Waste water undergoes a two step chemical demetallizing treatment of reaction-precipitation-separation, respectively at acidic and alkaline pH with addition of flocculation additives. A mixed V/Ni-sludge optionally containing catalytic metals is recovered in a sludge buffer tank. The sludge is then dewatered to residual moisture of 25-35% by mean of a filtration to obtain a cake. Such a waste water processing method is described below in details with respect to FIG. 2.

Resulting cake is further dried if pyrometallurgical metal recycling is chosen. In this case, cakes are loaded into molten iron to obtain reduced iron-molybdenum-nickel alloy that is valuable to steel manufacturers, and an upper layer constituted of divanadium pentoxyde ($V_2O_5$) which is removed. $V_2O_5$ can be processed using standard metallurgy to obtain vanadium-iron alloys or pure vanadium, depending on refining method and expected product specification.

Hydrometallurgical and electrochemical methods may also be useful for the isolation of metal constituents of the cake. Methods described by M. Marafi and A. Stanislaus in *Resources, Conservation and Recycling* 53 (2008), 1-26 and references cited therein are suitable for this purpose. The aforesaid document and references cited therein are hereby incorporated by reference.

Molybdenum and nickel, or molybdenum and vanadium may be used as sulfides for slurry hydroconversion. These combinations may have advantages in term of e.g. desulfuration or arsenic removal within the slurry process, depending on the feedstock. In this respect, one can use crude cakes and remove only one of nickel and vanadium and make an adjustment in the remaining element, namely molybdenum Pure Molybdenum oxide, iron oxide or tungsten oxide may be used for the preparation of the slurry catalyst. Alternatively, other Mo, Fe or W sources may be used which would enhance solubility of metal species in liquid hydrocarbon media such as crude oil. For instance, dicyclopentadienyl iron or dicyclopentadienyl molybdenum dichloride is suitable for the preparation of finely dispersed iron sulfide or molybdenum sulfide.

Usually, soluble metal species are sulfided using elemental sulfur or $H_2S$ or any suitable sulfur source such as dimethyldisulfide (DMDS), diethyldisulfide (DEDS) or a mercaptide such as methyl mercaptan or ethyl mercaptan.

Advantageously, catalysts may be prepared using $H_2S$ containing gas issued from a refinery stream such as (i) fuel gas or (ii) $H_2S$ rich gas which is dedicated to the feeding of sulfur recovery units (SRU) (e.g. Claus units).

In any case, it is desired that sulfidation of homogenous metal species in organic or aqueous media results in finely divided metal sulfide particles with a defined granulometry. Granulometry can be adjusted by varying stirring, reaction vessel temperature and sulfidation reactant or metal species introduction rate.

In case of ore catalyst (e.g. $MoS_2$=molybdenite), granulometry is comprised between 10 to 500 microns, preferably 100 to 200 microns. Concentration is up to 1% wt when slurry reactor is in operation.

In case of liposoluble or hydrosoluble precursor (e.g. dicyclopentadienyl molybdenum dichloride or dicyclopentadienyl iron), concentration of respectively prepared molybdenum sulfide ($MoS_2$) and iron sulfide (FeS) in the slurry reactor in operation is up to 1000 ppm, preferably between 100 and 300 ppm.

EXAMPLES OF PDX CAKE COMPOSITIONS THAT ARE GENERATED

Example 1

Ural visbroken vacuum residue (V: 212 ppm and Ni: 71 ppm). Average cake composition after gasification in a PDX plant: 25-35% wt Vanadium, 8-15% wt Nickel, 10-22% wt Iron, organic phase plus organic matter 30-55% (water 20-35% wt).

Slurry hydroconversion of above-mentioned Ural visbroken residue with 200 ppm Mo plus gasification leads to the average cake composition:

21-30% wt Molybdenum, 23-32% wt Vanadium, 7-14% Nickel, 9-20% Iron, organic phase plus organic matter 9-32% (water 18-32%)

Example 2

On Ural visbroken vacuum residue, slurry hydroconversion with 350 ppm Mo, 50 ppm V plus gasification leads to an average cake composition: 25-35% wt Molybdenum, 15-21% wt Vanadium, 5-9% wt Nickel, 6-13% wt Iron, organic phase plus organic matter 6-21% wt (water 12-21% wt).

Example 3

On average vacuum residue (V content: 20 to 400 ppm, Ni: 5 to 150 ppm), slurry hydroconversion with 200 ppm Mo plus gasification leads to the average cake composition:

27-38% wt Molybdenum, 2-43% wt Vanadium, 7-27% wt Nickel, 7-14% wt Iron, organic phase plus organic matter 7-23% wt (water 13-23% wt).

Slurry units can be operated with different kind of feedstock: atmospheric and vacuum residues, pitch coming from deasphalting, deasphalted oil, visbroken effluents (thermal cracking), shale oils, biomass ex-pyrolysis and ex-hydrothermal treatment, coal and, at least theoretically, petcoke from delayed coker.

Other feedstocks can also be coprocessed together with petroleum residue: tires, polymers, road bitumen.

Feedstock Characteristics:

Shale oils are impurities rich. Typical shale oil has the following average characteristics:

TABLE 1a

Shale oil typical characteristics

| Characteristic | Observed value | Unit |
|---|---|---|
| gravity | 900-1076 | kg/m$^3$ |
| ° API | 7.9-25 | |
| C | 78-86 | % wt |
| H | 7.5-12 | % wt |
| H/C | 1.2-1.7 | Atomic ratio |
| O | 0.7-7.5 | % wt |
| S | 0.5-7.5 | |
| N | 0.1-2.5 | % wt |
| Arsine | 5.6-50 | ppm |
| Antimony Sb | | |
| Olefins (Bromine number) | 20-1260 | gBr$_2$/100 g |

TABLE 1b

Shale oil typical Simulated Distillation
Example of typical Simulated Distillation:

| IP | 80 | ° C. |
|---|---|---|
| 10% wt | 200 | ° C. |
| 20% wt | 250 | ° C. |
| 50% wt | 400 | ° C. |
| 70% wt | 450 | ° C. |
| 90% wt | 560 | ° C. |

Simulated Distillation Method:

Hydrocarbons are introduced in a gas chromatography column and are separated according to their boiling point and affinity with the stationary phase. Column temperature is increased. Boiling points are deducted from a calibrating curve, obtained in the same operating conditions with a known hydrocarbon mixture.

The column used is a Simdis HT 750 from Analytical Controls; length=5 m; Film=0.09 μm; Internal Diameter=0.53 mm (AC part no.: 24001.065). As calibration mixture the following may be used:

1. A C5-C28 mixture from Analytical Controls (AC part no.: 59.50.101N,

2. A C30-C120 mixture from Analytical Controls (Ac part no.: 59.50.100B).

IP means Initial distillation Point: temperature corresponding to a curve area of 0.5% of full chromatogram area.

FP means Final distillation Point: temperature corresponding to a curve area of 99.5% of full chromatogram area Shale oil contains some impurities which are catalysts poisons such as Arsine ($AsH_3$). Arsine is the worst poison of hydroprocessing catalyst (NiMo, CoMo). Alternative processes for shale oil refining are hampered by the presence of arsine, which poisons their catalytic functions. During hydrotreatment, arsine is deposed on the catalyst and trapped as nickel arsenide. Preferably, fresh catalyst is continuously added so that catalyst poisoning does not impact slurry hydroprocessing performances or the effluent qualities.

TABLE 2a typical characteristics of Atmospheric and Vacuum residues

| Characteristic | Observed value | Unit |
|---|---|---|
| gravity | 995-1030 | kg/m$^3$ |
| ° API | 10.7; 5.8 | |
| C | 82-85 | % wt |
| H | 9-14 | % wt |
| H/C | 1.3-2 | Atomic ratio |
| S | 0.3-4 | % wt |
| Ni | 1-94 | ppm |
| V | 5-448 | ppm |
| Asphaltenes C$_7$ (ASTM D6560) | 2-20 | % wt |

TABLE 2b typical simulated distillation of Atmospheric and Vacuum residues
Example of typical Simulated Distillation:

| IP | 433 | ° C. |
|---|---|---|
| 10% wt | 544 | ° C. |
| 20% wt | 576 | ° C. |
| 50% wt | 636 | ° C. |
| 70% wt | 688 | ° C. |
| FP 88% wt | 748 | ° C. |

TABLE 3a typical characteristics of Pitch

| Characteristic | Observed value | Unit |
|---|---|---|
| Deasphalting solvent | C$_3$ to C$_5$ | — |
| Gravity | 1.1-1.2 to solid | t/m$^3$ |
| Conradson Carbon | 50 | % wt |
| Sulfur | 6.5 | % wt |

TABLE 3b typical Simulated Distillation of Pitch

Example of typical Simulated Distillation:

| 1% wt | 222 | ° C. |
|---|---|---|
| 10% wt | 310 | ° C. |
| 30% wt | 590 | ° C. |

TABLE 3b-continued typical Simulated Distillation of Pitch

Example of typical Simulated Distillation:

| | | |
|---|---|---|
| 50% wt | 682 | °C. |
| FP 57% wt | 740 | °C. |

TABLE 4a typical characteristics of Deasphalted oil

| Characteristic | Observed value | Unit |
|---|---|---|
| Deasphalting solvent | $C_3$ to $C_5$ | — |
| Gravity | 0.970-1.025 | t/m$^3$ |
| Conradson Carbon | 7-22 | % wt |
| Sulfur | 1-5 | % wt |
| Asphaltenes $C_7$ | <0.05-3 | % wt |

TABLE 4b typical Simulated Distillation of Deasphalted oil

Example of typical Simulated Distillation:

| | | |
|---|---|---|
| IP | 371 | °C. |
| 10% wt | 513 | °C. |
| 20% wt | 543 | °C. |
| 50% wt | 603 | °C. |
| 70% wt | 643 | °C. |
| FP 95% wt | 741 | °C. |

TABLE 5a typical characteristics of Visbroken residue:

| Characteristic | Observed value | Unit |
|---|---|---|
| Gravity | 995-1080 | kg/m$^3$ |
| Conradson Carbon | 22-33 | % wt |

TABLE 5b typical Simulated Distillation of Visbroken residue:

Example of typical Simulated Distillation:

| | | |
|---|---|---|
| IP | 384 | °C. |
| 10% wt | 496 | °C. |
| 20% wt | 536 | °C. |
| 50% wt | 613 | °C. |
| 70% wt | 680 | °C. |
| FP 82% wt | 748 | °C. |

TABLE 6 typical characteristics of Polymers:

| Elemental composition (dry basis) | Value observed | unit |
|---|---|---|
| C | 40-96 | % wt |
| H | 3-4 | % wt |

TABLE 6-continued typical characteristics of Polymers:

| Elemental composition (dry basis) | Value observed | unit |
|---|---|---|
| H/C | 0.38-1.20 | Atomic ratio |
| O | 0-50 | % wt |

TABLE 7 typical characteristics of Petcoke:

| Elemental composition (dry basis) | Value observed | unit |
|---|---|---|
| C | 86-88 | % wt |
| H | 3-4 | % wt |
| H/C | 0.41-0.56 | Atomic ratio |
| N | 1 | % wt |
| S | 7.5 | % wt |
| Ni + V | 750 | ppm |

TABLE 8 typical characteristics of Pyrolysis Bio-oil

| Characteristic | Observed value | Unit |
|---|---|---|
| Moisture content | 15-30 | % wt |
| Elemental composition (dry basis): | | |
| C | 54-58 | % wt |
| H | 5-8 | % wt |
| H/C | 1.03-1.78 | Atomic ratio |
| N | 0-0.2 | % wt |
| O | 35-40 | % wt |
| Solids | 0.2-1 | % wt |

TABLE 9 typical characteristics of Slurry from pyrolysis bio-oil, usually sent to gasification

| Characteristic | Observed value | Unit |
|---|---|---|
| Moisture content | 9-18 | % wt |
| Elemental composition (dry basis): | | |
| C | 72-75 | % wt |
| H | 3-5 | % wt |
| H/C | 0.48-0.83 | Atomic ratio |
| O | 20-25 | % wt |
| Coke particles | 40 | % wt |

TABLE 10 typical characteristics of Bio-oil ex hydrothermal conversion:

| Characteristic | Observed value | Unit |
|---|---|---|
| Moisture content | 9 | % wt |
| Elemental composition (dry basis): | | |
| C | 73.7 | % wt |
| H | 7.6 | % wt |
| H/C | 1.24 | Atomic ratio |

TABLE 10-continued typical characteristics of Bio-oil ex hydrothermal conversion:

| Characteristic | Observed value | Unit |
|---|---|---|
| O | 15.3 | % wt |
| N | 3.3 | % wt |

A slurry pilot characteristics and operation is now described:

A heavy feedstock, e.g. vacuum residue, is heated in order to reduce its viscosity, mixed with hydrogen-rich gas (preferably hydrogen deprived of contaminants which may impair activity of catalysts), and with a dispersed catalyst.

The dispersed catalyst is prepared within the slurry pilot unit by activation of a catalytic precursor in a stirred vessel, according to the following procedure. The catalytic precursor is injected into the stirred vessel, eventually with a solvent and/or a dispersant, together with a sulfiding agent. The mixture can be heated under optionally programmable operating conditions (temperature, pressure, concentration of sulfidation agent, residence time) depending on the sulfiding agent and catalytic precursor.

The slurry unit is equipped with two such stirred vessels so that while catalyst is prepared in one vessel, the content of the other vessel feeds the pilot.

Feedstock, catalyst and hydrogen are mixed together and sent to the reaction section. This section contains at least one, preferably two or more reactors. Using several reactors allows the use of different reaction conditions and catalysts, depending on the feedstock to be treated and final product specifications expectations.

Effluents are fractionated using separators, strippers, filters and a vacuum column.

The unit can recycle remaining atmospheric or vacuum residue.

Applied operating conditions can reach up to 200 bars and 480° C. in the reactor.

A conventional slurry plant can be designed according to U.S. Pat. No. 6,190,542.

The invention is now described with reference to appended FIGS. 1-2, which depict non-limitative methods for upgrading a heavy feedstock and for recycling metals contained in a metal containing residue issued there from.

The following examples and figures illustrate the invention.

An improved slurry pilot plant as well as its operation is now described with reference to FIG. 1:

A feedstock is processed according to three main sections: additive and feedstock preparation 10, 20, reaction 40, 50, and separation 55, 60, 70. Additional optional solid-liquid separation 80 may be added. Each section can be made of different parts:

1—Additives and feedstock preparation: precursor activation, hydrogen, catalyst and feedstock mixture, heating.

2—Reaction: one or more reactors in series (preferably up to 3) for e.g. removal of sulfur, nitrogen, oxygen, and optionally arsine and phosphorous.

3—Separation: separators, atmospheric fractionation D1, 60, vacuum fractionation D2, 70, filtration 80, heat exchange 30.

1—Additives and Feedstock Preparation:

The catalytic additive is added at different concentrations, depending on its properties (reactivity, specificity, operating conditions (temperature, pressure) . . . ).

Sulfided metals active for hydroconversion are added at concentrations between 10 to 100000 ppm, preferably from 100 to 10000 ppm, more preferably from 200 to 1000 ppm.

Metals active for hydroconversion are transition metals and tin. Preferred metals are selected among Mo, Ni, Co, W, Cr, V, Fe, Sn and combinations thereof.

The catalytic precursor can be handled as water soluble, oil soluble or finely powdered solid, depending on forthcoming sulfidation conditions.

Sulfidation can be performed using a sulfiding agent 15, 25, (such as DMDS), $H_2S$ or the sulfur contained in the feed.

In order to improve additive dispersion and to limit foaming, crushed solids or other additives can be added (e.g. crushed coke 2% wt, granulometry 300 to 500 microns; alumina; thiosilicates; sulfonates or calcium carbonate; as well as any other suitable additive as those described in U.S. Pat. No. 5,954,945.

Liquid hydrocarbon (Streams 11, 21) (solvent, feedstock to treat, distillate . . . ) can be mixed with these additives under appropriate concentrations depending on the type of additive.

Hydrogen or hydrogen-rich gas or a mixture of hydrogen and $H_2S$ 12, 22 is added at the appropriate flows. Part of the hydrogen-rich gas 22 is injected upstream of the preheater 30 together with the feed, in order to limit furnace coking. Remaining $H_2$ is added upstream of the first reaction section 42, and possibly of the second reaction section 52.

Catalytic additive activation can be achieved in dedicated vessels 10, 20.

Catalyst additive activation conditions differ depending on the catalytic additive type and feedstock composition to treat 11, 21: temperature (including sometimes stages), pressure, sulfiding agent ratio 15, 25, stirring.

Two (or more) vessels 10, 20 can be arranged in parallel, so that two different catalytic additives can be activated. That way, hydroconversion can benefit the synergy effect of different catalytic additives. To the extent the reactions conditions are close (optimal temperature, pressure (hydrogen, other gases), optionally reaction time), two different catalysts may be added in the same reactor 40, 50. If reaction times differ from a catalyst to another, their concentration in the same reactor may be adapted accordingly. In the present scheme 2, catalytic additive issued from vessel 20 can be introduced upfront the preheater 30 via feeding line 26.

If operating conditions widely differ, it is preferred that different catalytic additives are added in separate reactors 40, 50. Extra reactors are added on purpose when supplemental different catalysts or reaction conditions are needed.

Catalytic additive issued from vessel 20 may also be added directly into separate reactor 50 via feeding line 27. Feeding line 27 can be equipped with preheating section (not represented on FIG. 1).

2-Reaction

Additive mixed feedstock 31 and feedstock 32 are blended and sent to preheater 30. Preheated stream 41 is mixed with required hydrogen 42.

Feedstock and optional supplemental hydrogen-rich gas 42 are pressurized and enter the hydroprocessing reaction section.

Hydroprocessing is preformed in hydrotreatment (HT) reactors (HT1 40, HT2 50) in slurry phase.

The hydroprocessing stage HT1 40 is preferably maintained at a temperature from 360 to 480° C., preferably from 400 to 440° C., and under a pressure of 50 to 300 bar, preferably from 100 to 200 bar.

The reactor can operate in upflow or down flow stream.

Effluents 51 are possibly sent in a second reactor 50. When required, effluents 51 can be sent together with catalytic additive 27, and/or 31 (not represented on FIG. 2) and additional hydrogen or hydrogen-rich gas or a mixture of hydrogen and $H_2S$ 52 in order to compensate hydrogen consumption in HT1 or increase hydrogen deck.

The hydroprocessing stage HT2 50 is preferably maintained at a temperature from 360 to 480° C., preferably from 380 to 440° C., and under a pressure 50 to 300 bar, preferably from 100 to 200 bar.

The reactor can operate in upflow or down flow reactor.

Separation

This section is characterized by sending the liquid effluent 51 or 56 to atmospheric fractionation, followed by vacuum fractionation.

At the reactor outlet, effluents 51 or 56 are flashed in a dedicated vessel 55 in order to remove gases 57. Liquid effluent 61 is collected and sent to atmospheric fractionation D1 60.

Gases 57 contain hydrocarbons, $H_2$ and $H_2S$. After hydrocarbons removal, the $H_2$ and $H_2S$-containing stream can be recycled (position of streams 12-15 and 22-25: $H_2$ for process consumption and $H_2S$ for catalytic precursor activation.

Atmospheric fractionation 60 can be performed using conventional distillation column or thin film evaporation technologies.

Atmospheric fractionation overheads 62, 64 are condensed and recovered, and valorized as a conventional atmospheric distillate.

Atmospheric fractionation bottom 63 is sent to a vacuum fractionation 70.

As an option, atmospheric fractionation bottom can be recycled upstream reactors 1 and 2 as stream 75.

Vacuum fractionation 70 can be performed using conventional distillation column or by thin film evaporator technologies.

Vacuum fractionation overheads 71, 72 are condensed, recovered and valorized as a conventional vacuum distillate.

Vacuum fractionation bottom 73 is sent to purge 74, to recycle 75 or to additional treatment such as solid-liquid separation 80, where solids 83 are separated from remaining residues.

Remaining vacuum bottoms 73 can be purged 74 or partially recycled back to first section 40 (stream 76) or to second section 50 (stream 77) hydroconversion section (recycle rate from 0 to 100%).

The recycle in second section 50 can be an advantage, as milder operating conditions or other catalysts are used. Obviously, remaining vacuum bottom 73, which already passed through the reaction section, might be more difficult (specific) to hydroconvert.

Separation Option:

The second (or more) reactor 50 can be placed after the atmospheric fractionation 60. In this case, reactor 50 is fed with stream 63 and feeds 70 with stream 56. That way, only atmospheric residue 63 enters the second reactor HT2 50. This second reactor can be processed under different operating conditions (milder temperature, specific catalyst vessel 20).

Solids Recovery:

Remaining vacuum bottoms to recycle 73-77 contain solids (catalyst, ore, coke, sediments). These solids may contribute to plugging during operation and to material deterioration.

These solids, including catalyst, additive, or sediments/coke, can be removed using a liquid/solid separation.

Different separations can be used: filters, membranes or centrifuges or equivalent.

Filters size depend on the catalyst 13, 23 and added additive 14, 24.

The solid-liquid separation difficulties come from the fact that the remaining vacuum residue 73 (called flakes) is viscous and has a density close to the solids to remove.

Membranes and filters may be subject to plugging. Centrifuges efficiency increases with density differential between the two elements to separate.

A solution lies in the appropriate position of this solid-liquid separation 80: Placed upstream of fractionation, the filtration will be performed with a less viscous and less dense liquid fraction.

Figure 1:
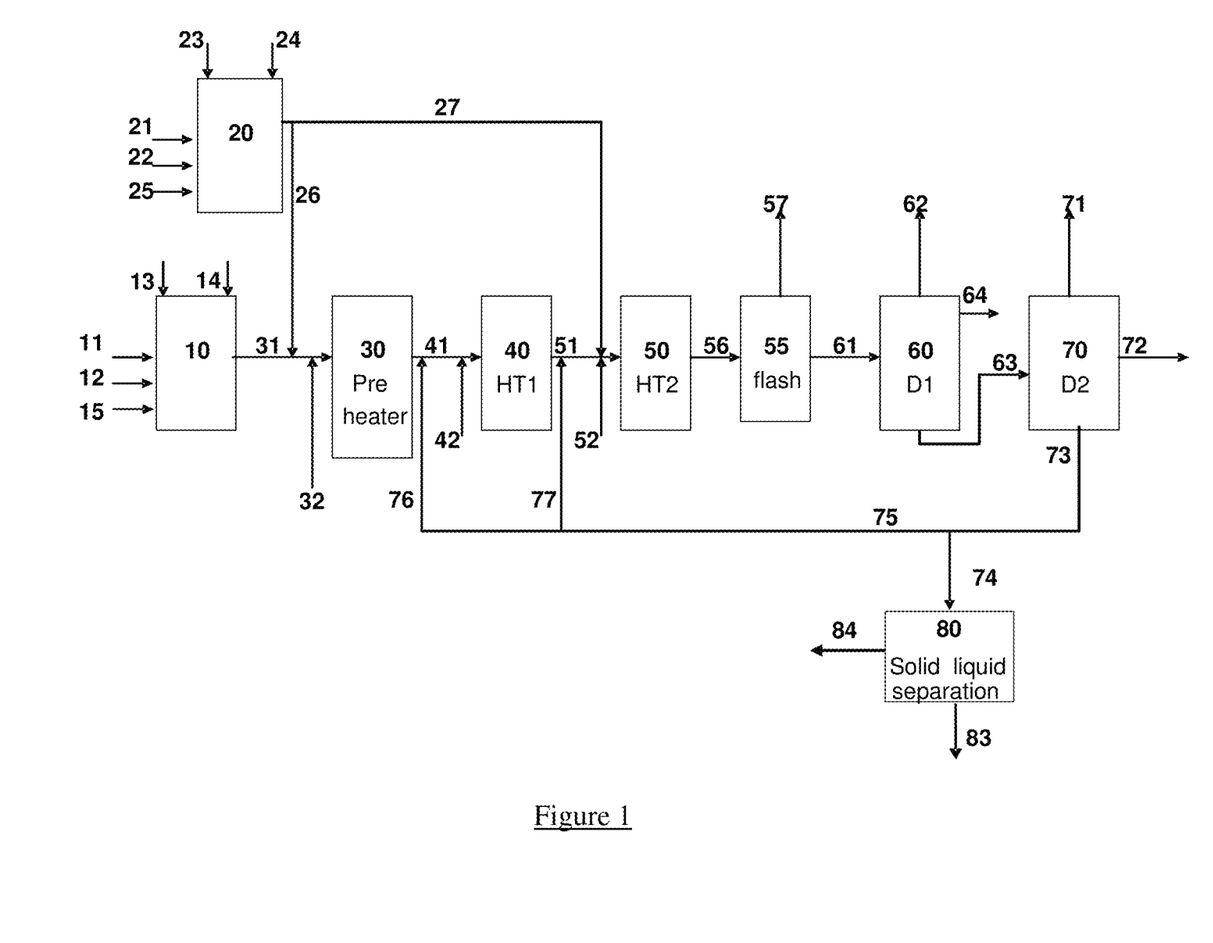
FIG. 1 represents a slurry unit used for upgrading a heavy feedstock.

Downstream of the vacuum fractionation: vacuum residue filtration, called flakes (position 1, standard position represented on FIG. 1).

Upstream of the atmospheric fractionation: on flashed effluent (position 2, not represented)

Upstream of the vacuum fractionation: atmospheric residue filtration (position 3, not represented). We can benefit from the high pressure differential.

Liquid out separation 84 is essentially deprived of solids or at least poorer in solids depending on separation efficiency (e.g. filter porosity).

Solids are recovered on stream 83. These solids are later sent to PDX unit in view of hydrogen generation and metals recycling or to any other suitable retreatment unit (e.g. kiln) in view of metal recycling.

According to the invention the solids recovered on stream 83 are treated in a PDX unit, in which they are burnt at 1300° C. in the presence of water and oxygen to produce carbon monoxide, hydrogen and a metal containing residue. Such a metal containing residue thus contains metals issued from the spent metal containing catalyst and/or from the metal containing hydrocarbon feedstock (or a metal containing residual hydrocarbon feedstock). Said in another way, this metal containing residue contains metals from catalyst and/or from feedstock and eventually carbon material if combustion is not complete.

This metal containing residue is collected and calcinated to remove carbon containing material. The resulting gas is scrubbed with circulating water to remove soot.

Figure 2:
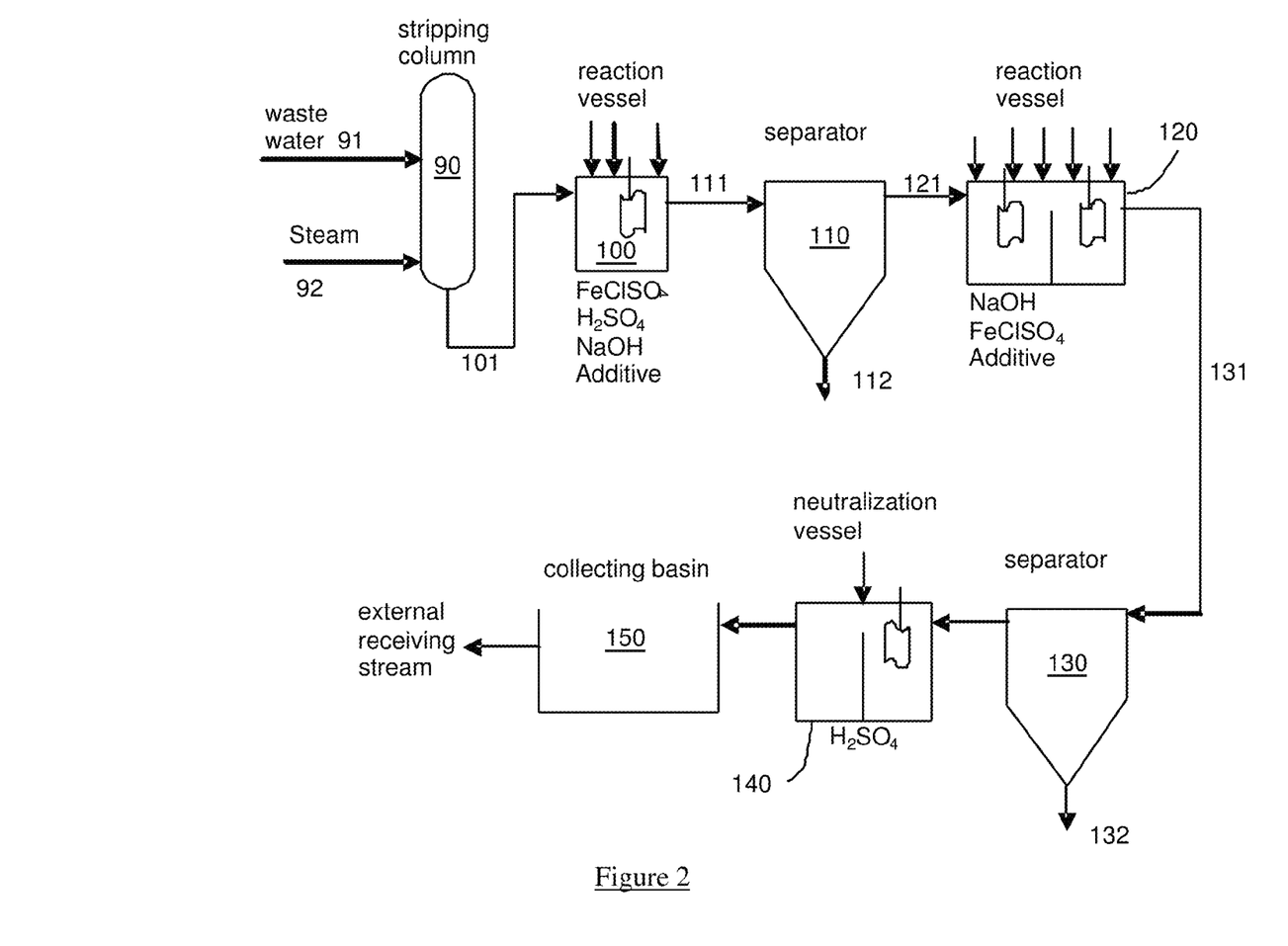
FIG. 2 represents a waste water treatment unit for recycling metals contained in waste waters issued from gasification/partial oxidation process of a metal containing residue issued from a slurry unit as depicted in FIG. 1.
Figure 3:
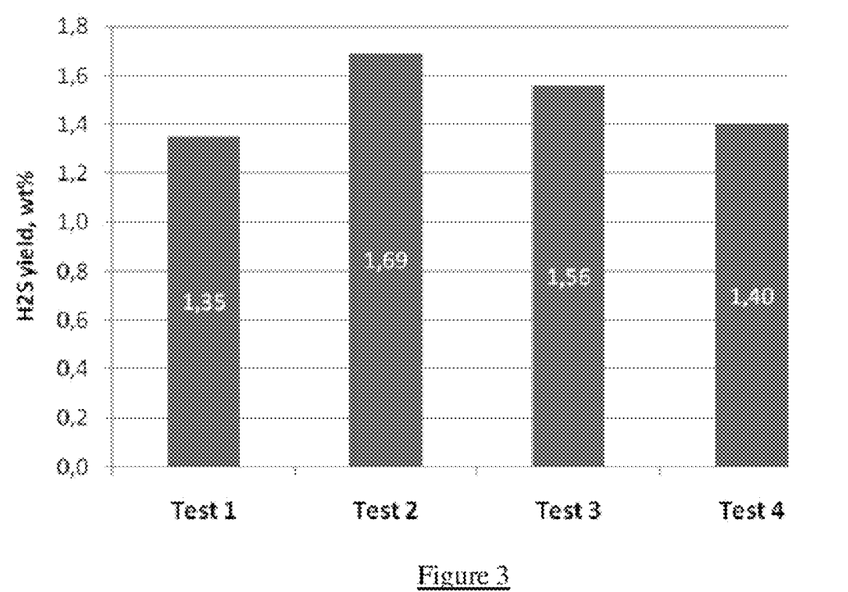
FIG. 3 represents $H_2S$ yields (wt %) for the different tests of example A (reaction time: 1 h; temperature: 430° C.).
Figure 4:
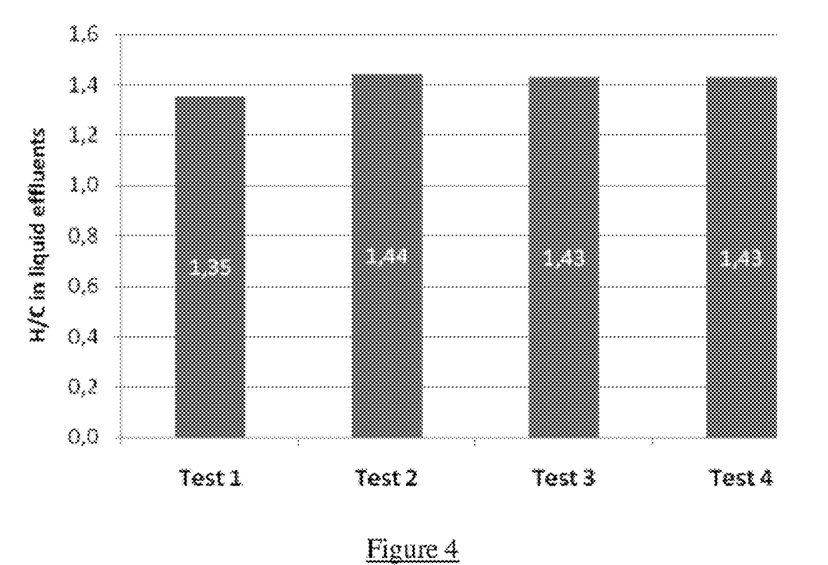
FIG. 4 represents the atomic H/C ratio in liquid in the 500+ fraction for the different tests of example A (reaction time: 1 h; temperature: 430° C.).

The waste water processing method is now described with respect to FIG. 2.

Waste water 91 is treated in a stripping column 90 for gas removal in presence of water vapor 92. The degasified water 101 is then conducted to a first stirred reaction vessel 100, within which are added an Iron(III) chlorosulphate $FeClSO_4$ solution at 40 wt %, sulphuric acid $H_2S_4$ solution at 96 wt %, if necessary sodium hydroxide NaOH solution at 23 wt %, as well as polyelectrolyte solution.

The $FeClSO_4$ dosage is regulated such that 22 to 27 L/h is added to 80 to 120 $m^3$/h of waste water. The $H_2SO_4$-dosage is the major addition to ensure an acid pH-value. The pH-value is set between 4.5 and 5.5. A NaOH solution can be added if necessary to regulate the pH-value. About 300 to 400 mL of a polyelectrolyte solution per $m^3$ of waste water is added between the reaction vessel 100 and a clarifying thickener and separator 110 as flocculation additive to improve the capacity to sediment the solid matter that is formed. An example of flocculation additive (polyelectrolyte) includes a mixture of polymers, surfactants and silica.

The clarifying thickener and separator 110 (instrument: SEDIMAT—high duty clarifying thickener) allows separation of the solid matter. The solid matter sinks slowly to the vessel floor and thickens into sludge. The sludge flows to a sludge buffer tank, reservoir of the dewatering part of the process to obtain a first precipitate 112; whereas the remaining clarified water (acidic water 121) flows to a reaction vessel 120.

Within reaction vessel 120, some flocculation additive is added (0.5 to 2 L/h) and the addition of $FeClSO_4$ regulates the basic pH-value, between about 7.8 and 8.5 (the advantage of $FeClSO_4$ is to minimize the addition of NaOH). Similarly, some polyelectrolyte optimizes the flocculation. Here, the polyelectrolyte is a cationic flocculation additive that improves flocculation and precipitation, and thus the metal recovering.

The alkaline water 131 issued from reaction vessel 120 is conducted to a second separator 130 wherein a second precipitate 132 is recovered.

The separated clarified water (alkaline water 131) is further neutralized in a neutralization vessel 140 by $H_2SO_4$ addition and collected in a collecting basin 150 for recycling in the refinery or for further purification.

Precipitates 112 and 132 recovered from separators 110 and 112 are dewatered by filtration or any appropriate mean to obtain cakes. A filter press is a suitable mean for this aim. The residual moisture depends on the filter strainer cloth quality of the filter press, and is about 20 to 35 wt %. These cakes are further treated for metals recovering as explained above.

EXAMPLES

Hydroconversion and hydrotreatment of a vacuum residue have been performed. The tested vacuum residue presents the following characteristics:

TABLE 11 characteristics of vacuum residue tested
(Arab Heavy Vacuum residue)

| Characteristic | Value |
|---|---|
| API | 3 |
| Density at 15° C. (g/ml) | 1.0581 |
| Sulfur (w %) | 5.58 |
| Nitrogen (w %) | 0.54 |
| MCRT ASTM D4530 (w %) | 25.0 |

TABLE 11-continued characteristics of vacuum residue tested
(Arab Heavy Vacuum residue)

| Characteristic | Value |
|---|---|
| Asphalthenes (C7 insol.), w % | 19.7 |
| C, w % | 84.2 |
| H, w % | 9.9 |
| H/C, atomic ratio | 1.41 |
| Ni, ppm | 70 |
| V, ppm | 215 |
| Cut points from ASTM D7169 | |
| IBP-200° C. fraction (w %) | 0.0 |
| 200-350° C. fraction (w %) | 0.0 |
| 350-500° C. fraction (w %) | 3.10 |
| 500-FBP fraction (w %) | 96.9 |

MCRT: Micro Carbon Residue Test

All tests have been performed in a 500 ml stirred batch reactor with continuous hydrogen feeding at constant pressure. The operating conditions are total pressure at 15 MPa, temperature between 420 and 450° C., $H_2$ flow set at 100 NL/h and stirring speed of 900 rpm.

The vacuum residue is pre-heated to reduce its viscosity and allow its transfer to the reactor. Catalyst precursors (molybdenum octoate, nickel octoate, iron octoate, ferrocene and/or molybdenocene) and liquid DMDS are added to the pre-heated vacuum residue in the reactor which is then closed. Hydrogen is then added and temperature increased with two stages at 250° C. and 320° C. for 10 minutes each. Then the reactor temperature is raised rapidly to the operating value.

At the end of the test, the reactor is cooled down and depressurized. All gaseous and liquid effluents are collected, weighed and analysed.

The gases are analysed on-line by gas chromatography (Agilent G2891 micro Gas Chromatograph) and the reaction products are analysed by high temperature gas chromatography (ASTM D7169) for determining the yields.

Example A

In this test series, the total catalytic metal (molar) content is kept constant but the Ni/Mo ratio is varied between 0 and 0.5. For this test series, the operating temperature is fixed to 430° C. during one hour.

TABLE 12 concentration of catalytic metals in the different tests
(wppm, based on the weight of the feedstock)

| Test | 01 | 02 | 03 | 04 |
|---|---|---|---|---|
| ratio Ni/Mo (mol/mol) | 0 | 0.1 | 0.3 | 0.5 |
| Catalyst Mo (wppm) | 500 | 454 | 384 | 333 |
| Catalyst Ni (wppm) | 0 | 28 | 71 | 102 |

For this test series, both molybdenum and nickel are added separately to the feedstock as octoate, which are both in the liquid state at ambient conditions.

Molybdenum octoate has supposedly the following formula: $C_{32}H_{60}MoO_8$. Nickel octoate has the following formula $C_{16}H_{30}NiO_4$.

300 mL of feedstock and the appropriate amount of molybdenum and nickel based catalyst precursors are fed into the reactor (see Table 12). 260 mol % of sulphur (compared to the amount of catalytic metals, molybdenum and nickel) as DMDS is also fed into the reactor as sulphiding agent. The reactor is pressurized with hydrogen and heated to the desired temperature 430° C. at a heating rate of 5° C./min.

Compositions of the products obtained are presented in table 13.

For all the tests, no coke formation was observed.

These results show that the appropriate choice of catalysts permits to enhance the quality of hydroconversion products (more hydrodesulfurisation particularly and higher hydrogen content in the bottom fraction) without modification of the operating conditions or conversion rate and without important modification in the ratios of the conversion products.

The results also show that due the conversion of 500+ cut, the concentration of metals (Mo, Ni, V) in the remaining 500+ increases compared to the original mixture of feed and catalytic metals.

TABLE 13

| | tests results | | | |
|---|---|---|---|---|
| Test | 1 | 2 | 3 | 4 |
| Conversion (+/−3%) | 42.1 | 41.6 | 42.1 | 43.3 |
| Density (15° C.) | 1.009 | 0.992 | 1.007 | 1.006 |
| API | 9 | 10 | 9 | 9 |
| Liquid effluents | | | | |
| Naphtha (C$_5$-200° C.) (wt %) (*) | 6.56 | 6.30 | 6.55 | 6.59 |
| Gas oil (200-350° C.) (wt %) (*) | 14.51 | 14.34 | 14.21 | 14.59 |
| Vacuum Gas oil (350-500° C.) (wt %) (*) | 21.37 | 20.84 | 21.61 | 21.62 |
| Residue (500+° C.) (wt %) (*) | 56.30 | 56.12 | 56.64 | 55.68 |
| S (weight %) | 4.90 | 4.00 | 3.90 | 4.00 |
| N (weight %) | 0.60 | 0.59 | 0.57 | 0.58 |
| H/C | 1.35 | 1.44 | 1.43 | 1.43 |
| Gaseous effluents | | | | |
| C$_1$-C$_2$ (wt %) | 1.45 | 1.50 | 1.38 | 1.32 |
| C$_3$-C$_4$ (wt %) | 1.07 | 1.37 | 1.11 | 1.03 |
| H$_2$ consumption wt % | −2.60 | −2.15 | −3.07 | −2.23 |
| H$_2$S yield (wt %) | 1.35 | 1.69 | 1.56 | 1.40 |
| 500+ fraction of liquid effluents (*) | | | | |
| Ni + V + Mo (ppm) | 1356 | 1313 | 1278 | 1270 |

(*) the range corresponds to the distillation range.

Example B

Ferrocene

Test series have been performed to compare ferrocene and iron octoate as precursors of an active catalytic phase for the hydroconversion of a vacuum residue.

Ferrocene has the following formula: Cp$_2$Fe (or (C$_5$H$_5$)$_2$Fe).

Iron octoate has the following formula: C$_{24}$H$_{45}$FeO$_6$

The same vacuum residue as in the previous examples was used as feed. Its composition is presented in table 11.

The different tests of a series have been performed at increasing temperature in the 420-450° C. range.

300 mL of feedstock and iron based catalyst precursor are fed into the reactor. For each catalyst precursor, 5000 wppm of Fe as Cp$_2$Fe or as Fe-octoate, is added to the feedstock (wppm: based on the weight of the feedstock). 130 mol % of sulphur (compared to iron) as DMDS is also fed into the reactor as sulphiding agent. The reactor is pressurized with hydrogen and heated to the desired temperature at a heating rate of 5° C./min.

Several tests have been performed with increasing temperature, until coke production appears. This temperature is considered as the maximum allowable temperature for hydroconversion using the particular slurry phase catalyst.

Figure 5:
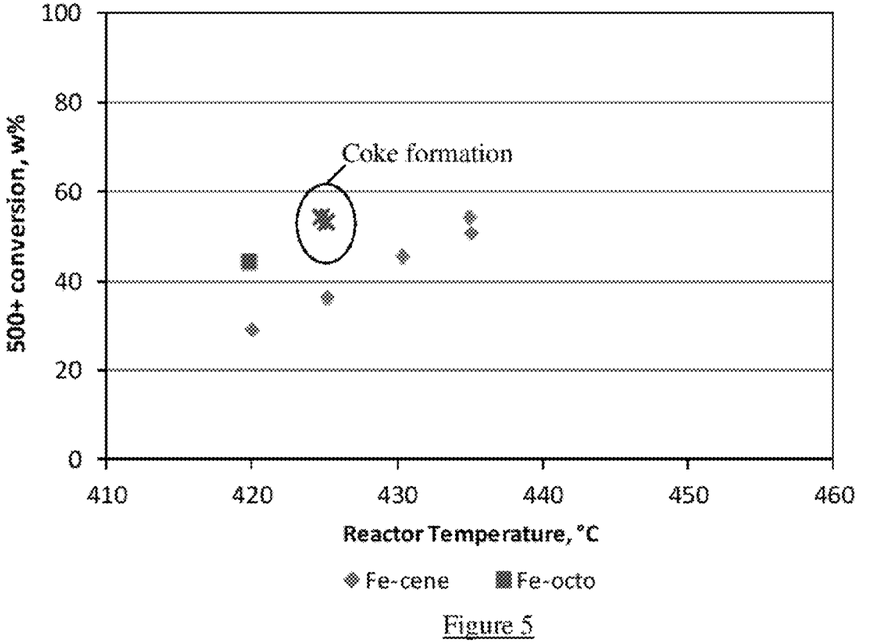
FIG. 5 represents the conversion of the 500+ fraction as a function of the reactor temperature with two oil-soluble iron catalyst precursors: ferrocene (Fe-cene) and iron octoate (Fe-octo). Conditions tested (example B): reaction time=1 h; catalyst concentration=5000 wppm metal. Crosses (x) indicate runs where coke formation occurred.

The results are presented in FIG. 5. In this graph conversions are plotted against temperature. The runs in which coke formation occurred are represented by crosses.

With iron octoate as precursor, coke formation occurred at 425° C. The maximum 500+ conversion without coke formation was observed at 420° C., and was of 45 w %.

With ferrocene as precursor, temperature could be raised to 435° C. without coke formation. The 500+ conversion observed at this temperature was of 57 w %.

This example series shows the potential of metallocenes as precursors for obtaining high hydrogenation activity catalysts for heavy feedstocks hydroconversion.

Example C

Molybdenocene

Tests have been performed to compare bis(cyclopentadienyl)molybdenum dichloride and Mo-octoate as precursors of an active catalytic phase for the hydroconversion of a vacuum residue.

bis(cyclopentadienyl)molybdenum dichloride has the following formula: Cp$_2$MoCl$_2$ (or (C$_5$H$_5$)$_2$MoCl$_2$).

Molybdenum octoate has supposedly the following formula: C$_{32}$H$_{60}$MoO$_8$ The same vacuum residue as in the previous examples was used as feed. Its composition is presented in table 11.

The different tests of a series have been performed at increasing temperature in the 420-450° C. range.

300 mL of feedstock and molybdenum based catalyst precursor are fed into the reactor. For each catalyst precursor, 500 wppm of Mo as Cp$_2$MoCl$_2$ or as Mo-octoate, is added to the feedstock (wppm: based on the weight of the feedstock). 260 mol % of sulphur (compared to molybdenum) as DMDS is also fed into the reactor as sulphiding agent. The reactor is pressurized with hydrogen and heated to the desired temperature at a heating rate of 5° C./min.

Several tests have been performed with increasing temperature, until coke production appears. This temperature is considered as the maximum allowable temperature for hydroconversion using the particular slurry phase catalyst.

Figure 6:
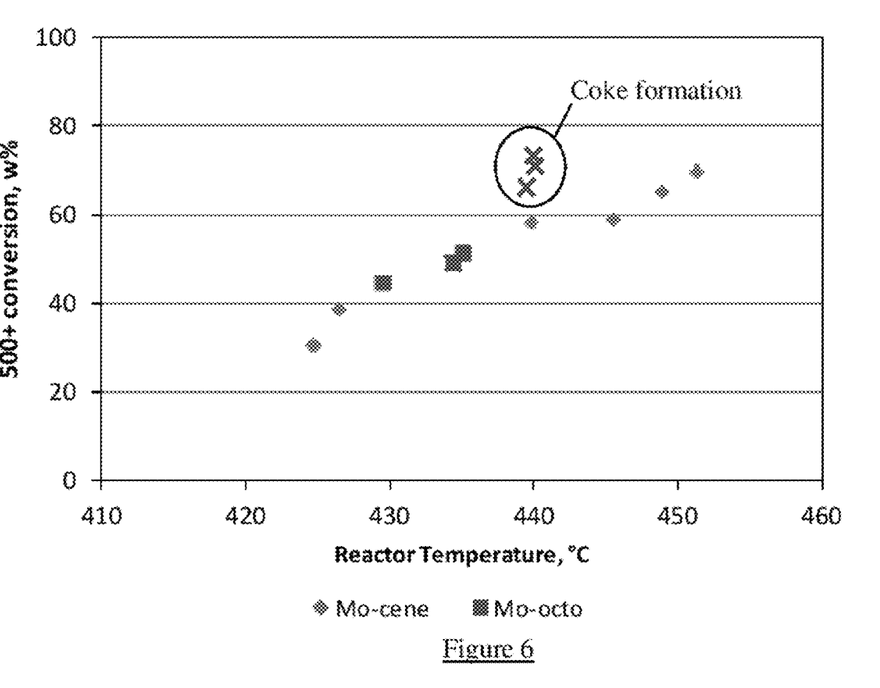
FIG. 6 represents the conversion of the 500+ fraction as a function of the reactor temperature with two oil-soluble molybdenum catalyst precursors: molybdenocene (Mo-cene) and molybdenum octoate (Mo-octo). Conditions tested (example C): reaction time=1 h; catalyst concentration=5000 wppm metal. Crosses (x) indicate runs where coke formation occurred.

The results are presented in FIG. 6. In this graph conversions are plotted against temperature. The runs in which coke formation occurred are represented by crosses.

With molybdenum octoate as precursor, coke formation occurred at 440° C. The maximum 500+ conversion without coke formation was observed at 435° C., and was of 52 w %.

With bis(cyclopentadienyl)molybdenum dichloride as precursor, temperature could be raised to 450° C. without coke formation. The 500+ conversion observed at this temperature was of 70 w %.

The use of a molybdenocene allows applying higher temperatures than the use of Mo-octoate, thus leading to deeper conversions together with the absence of coke formation.

Example D

Blank Test

The same test has been performed without any catalyst and with a blend of atmospheric residue. The composition of this feedstock is given in table 14. The hydrogen flow was set at 0 Nl/h. The feedstock was processed during 30 min at a temperature of 420.5° C. An important amount of coke was produced, which illustrates the effect of catalyst for suppression of coke.

TABLE 14 characteristics of vacuum residue tested
(Arab Heavy Vacuum residue)

| Characteristic | Value |
|---|---|
| API | |
| Density at 15° C. (g/ml) | 0.9671 |
| Sulfur (w %) | 3.13 |
| Nitrogen (w %) | 0.25 |
| MCRT ASTM D4530 (w %) | 8.3 |
| Asphalthenes (C7 insol.), w % | 2.9 |
| Ni, ppm | 20 |
| V, ppm | 50 |
| Cut points from ASTM D7169 | |
| IBP-200° C. fraction (w %) | 0.0 |
| 200-350° C. fraction (w %) | 5.1 |
| 350-500° C. fraction (w %) | 40.9 |
| 500-FBP fraction (w %) | 54.0 |

MCRT: Micro Carbon Residue Test

The invention claimed is:

1. A method for recycling molybdenum, vanadium and nickel contained in a spent catalyst and/or a metal containing hydrocarbon feedstock, wherein said spent catalyst and/or metal containing hydrocarbon feedstock successively undergoes (i) calcination performed so as to collect carbon monoxide and hydrogen and to remove carbon containing material, (ii) washing with water, (iii) acidification with sulfuric acid to obtain an acidic water and a first precipitate which is separated, (iv) alkalinization of said acidic water with sodium hydroxide to obtain an alkaline water and a second precipitate which is separated, wherein said spent catalyst and/or metal containing hydrocarbon feedstock is obtained by the treatment of a metal containing hydrocarbon feedstock issued from an industrial unit using a metal containing catalyst, and wherein before step (i) said spent catalyst and/or metal containing hydrocarbon feedstock are collected and treated to produce carbon monoxide, hydrogen and a metal containing residue, said metal containing residue being processed by steps (i) to (iv).

2. A method according to claim 1, wherein iron chlorosulfate ($FeCl(SO_4)$) is added at steps (iii) and (iv).

3. A method according to claim 1, wherein (v) said alkaline water is further neutralized with an acid.

4. A method according to claim 1, wherein first and/or second precipitate is introduced into melted iron to obtain vanadium pentoxide ($V_2O_5$), and iron-molybdenum-nickel alloy.

5. A method according to claim 1, wherein the treatment of said spent catalyst and/or metal containing hydrocarbon feedstock before step (i) is a calcination.

6. A method according to claim 5, wherein the treatment is a calcination under partial oxidation conditions.

7. A method according to claim 1, wherein the industrial unit is a slurry plant.

8. A method according to claim 1, wherein the metal containing hydrocarbon feedstock is issued from a reactor of an industrial unit.

9. A method according to claim 1, wherein the metal contained in the metal containing catalyst or in the spent metal containing catalyst and the metal contained in the metal containing hydrocarbon feedstock or in the metal containing residual hydrocarbon feedstock are each independently selected among aluminum, tin, transition metals and combinations thereof.

10. A method according to claim 9, wherein the metal contained in the metal containing catalyst or in the spent metal containing catalyst is selected among aluminum, iron, molybdenum, tungsten, nickel, cobalt and their combinations.

11. A method according to claim 9, wherein the metal contained in the metal containing hydrocarbon feedstock or in the metal containing residual hydrocarbon feedstock is selected among vanadium, nickel, cobalt, iron, and combinations thereof.

12. A method according to claim 1, wherein hydrogen is used for the hydroconversion of the metal containing hydrocarbon feedstock.

13. A method according to claim 1, wherein the metal containing residue is recycled to produce fresh metal containing catalyst.

14. A method according to claim 1, further comprising hydroconversion of a hydrocarbon feedstock in a slurry reactor, using said hydrogen.

15. A method according to claim 7, wherein said spent metal containing catalyst and metal containing residual hydrocarbon feedstock are issued from deasphalting residue.

16. A method for producing hydrogen, comprising recycling a spent catalyst and/or a metal containing hydrocarbon feedstock, by performing the method according to claim 1, so as to collect hydrogen.

* * * * *